Dec. 29, 1931.   R. H. BROCKMAN   1,839,139
LATHE TOOL HOLDER
Filed Nov. 29, 1930

Inventor:
Robert H. Brockman
by Calvert Raturs
Att'ys.

Patented Dec. 29, 1931

1,839,139

UNITED STATES PATENT OFFICE

ROBERT H. BROCKMAN, OF ST. PETERSBURG, FLORIDA

LATHE TOOL HOLDER

Application filed November 29, 1930. Serial No. 499,088.

In the use, by dentists and others, of an abrading tool comprising a rotary body on which a sleeve or ring of sand or emery paper, or the like, is mounted, it is necessary to change the abrading sleeve or ring frequently, for the reason that these sleeves or rings wear out quickly; and it is desirable, in order to do this readily, to remove the abrading tool from the rotating holder without stopping the rotation of such holder. This invention has for its object to provide a convenient construction by which an abrading or other rotary tool may be connected with or disconnected from a rotary arbor or tool while said arbor or holder is running.

Figure 1:
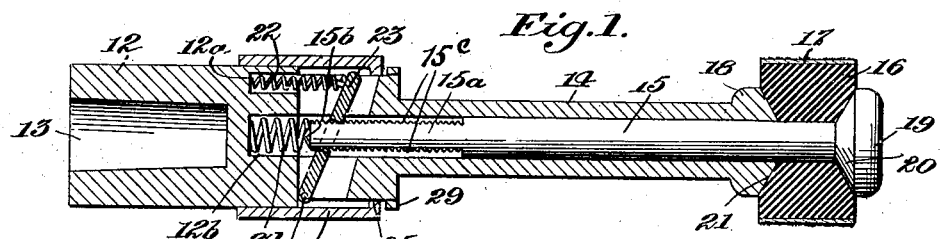
Figure 2:
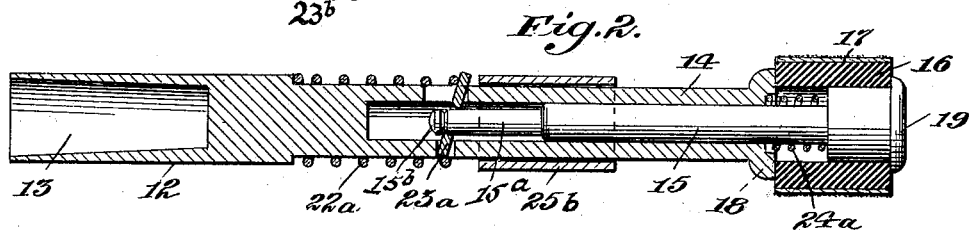
Figure 3:
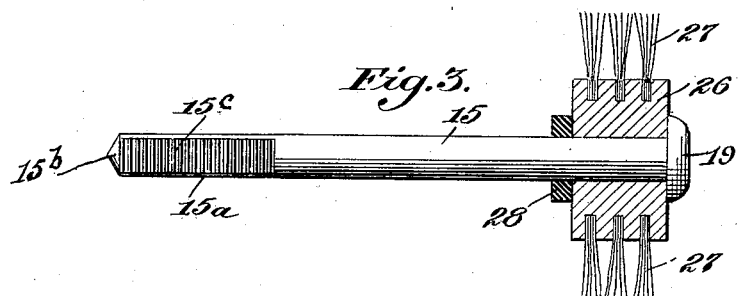
Figure 4:
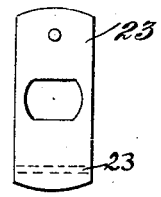

In the accompanying drawings Fig. 1 is a longitudinal section of a tool holder embodying one form of the present invention. Fig. 2 is a sectional view showing another form of the invention. Fig. 3 shows a brush wheel cleaning tool which may be placed in a holder in substitution of the abrading tool shown in Figs. 1 and 2. Fig. 4 is a detail view of the gripping dog shown in Fig. 1.

Referring to Fig. 1 of the drawings, 12 denotes a holder having a slightly tapering recess 13 which is intended to receive the end of a lathe spindle. Rigid with the holder 12 is a hollow part or sleeve 14 into the interior of which extends a spindle 15 on which an abrading wheel comprising a rubber body 16 onto which is fitted an outer sleeve or ring 17 of sand or emery paper or the like. The sleeve 14 is provided with a shoulder 18 and the spindle 15 is provided with a head 19 and is also preferably provided with circumferential bevelled portions 20 and 21, these bevelled portions extending within the rubber body 16.

The spindle 15 is constructed with a reduced portion $15^a$ the extreme end of which is tapered as shown at $15^b$. This reduced portion $15^a$ of the spindle 15, as shown in Fig. 1, is flattened and roughened or corrugated at $15^c$, so that the dog 23 will grip the same firmly.

The holder 12 is provided with a recess $12^a$ which receives a spiral spring 22 bearing against the gripping dog 23 shown as being pivoted at $23^b$ and which, when tilted or canted somewhat, will grip the reduced part $15^a$ of the spindle 15 to hold said spindle in the holder 12. The holder 12 is also provided with a second recess $12^b$ within which is housed a coil spring 24 bearing against the inner end of the spindle 15, $15^a$.

Slidingly mounted on the holder 12 is a sleeve 25 having an inwardly projecting flange $25^a$ which, when said sleeve is moved to the left, Fig. 1, will engage the top of the gripping dog to release it from the spindle 15, $15^a$; and said spindle will then be ejected from the sleeve part 14 of the holder by the spring 24, thus disengaging the tool from said holder. Fixed to the holder 12 is a collar 29 which will serve to retain the sleeve 25 on said holder.

In inserting a tool into the holder 12 the rubber body 16 will be compressed against the holder 18 and will be expanded by the bevelled portions 20 and 21 on the spindle 15, so as to hold the abrading ring 17 tightly thereon, as will be understood.

In place of the abrading tool shown in Fig. 1 a cleaning brush may be mounted on the spindle 15, as shown in Fig. 3, said cleaning brush comprising a body 26 and bristles 27. The said cleaning brush may be retained on the spindle 15 by a rubber washer 28 tightly mounted on said spindle.

From the foregoing it will be understood that if it be desired to remove the abrading or other tool from the holder 12 attached to the lathe spindle the sleeve 25 may be moved normally to the left, so that the internal flange $25^a$ will engage the upper end of the inclined gripping dog 23 and will straighten up said dog to release it from the spindle 15, and the tool will then be forced outward or ejected by the spring 24. This operation may be performed while the lathe spindle, to which the holder 12 is attached, is running, and the abrading or other tool may be replaced while the said spindle is still running, so that these tool-removing and replacing operations may be performed without stopping the lathe.

In the modified form of the invention shown in Fig. 2 the holder 12, recess 13, sleeve 14, spindle 15, rubber body 16, abrading ring 17, shoulder 18 and head 19 are all similar to the corresponding parts shown in Fig. 1. In this modified form of the invention the upper end of the gripping dog 23ª is tilted so that it will grip the spindle 15, by a coil spring 22ª mounted on the sleeve 14. Slidingly mounted on the said sleeve 14 is a releasing sleeve 25ᵇ which, when moved to the left, will straighten up the said gripping dog, thus releasing the said spindle so that the tool will be ejected from the holder by the coil spring 24ª housed in a recess in the rubber body 16.

Having thus described my invention I claim and desire to secure by Letters Patent:

1. An arbor tool holder for lathes comprising a hollow part or sleeve, a tool having a spindle fitting loosely in said hollow part or sleeve, a spring-pressed gripping dog adapted to retain said tool spindle in said hollow part or sleeve, a sleeve slidingly mounted on said holder and by which said gripping dog may be released, and a spring for ejecting said tool from said holder when said gripping dog has been released from the tool holder.

2. An arbor tool holder for lathes comprising a hollow part or sleeve having a shoulder at its end, a tool having a spindle fitting loosely in said hollow part or sleeve, a spring-pressed gripping dog adapted to retain said tool spindle in said hollow part or sleeve, a sleeve slidingly mounted on said holder and by which said gripping dog may be released, and a spring for ejecting said tool from said holder when said gripping dog has been released from the tool spindle, said tool comprising a rubber body and an abrading ring encircling said body, and said spindle having circumferential bevelled portions bearing against said rubber body and serving to expand the same when said body is compressed against said shoulder.

3. An arbor tool holder for lathes comprising a hollow part or sleeve, a tool having a spindle fitting loosely in said hollow part or sleeve, a spring-pressed gripping dog adapted to retain said tool spindle in said hollow part or sleeve, a sleeve slidingly mounted on said holder and by which said gripping dog may be released, and a spring for ejecting said tool from said holder when said gripping dog has been released from the tool holder, said spindle having a roughened or corrugated part to be engaged by said gripping dog.

4. An arbor tool holder for lathes comprising a hollow part or sleeve, a tool having a spindle fitting loosely in said hollow part or sleeve, gripping means adapted to retain said tool spindle in said hollow part or sleeve, and a sleeve slidingly mounted on said holder and by which said gripping means may be released.

In testimony whereof I affix my signature.

ROBERT H. BROCKMAN.